(12) United States Patent
Archer et al.

(10) Patent No.: US 8,370,844 B2
(45) Date of Patent: Feb. 5, 2013

(54) MECHANISM FOR PROCESS MIGRATION ON A MASSIVELY PARALLEL COMPUTER

(75) Inventors: Charles Jens Archer, Rochester, MN (US); David L. Darrington, Rochester, MN (US); Patrick Joseph McCarthy, Rochester, MN (US); Amanda Peters, Rochester, MN (US); Albert Sidelnik, Urbana, IL (US)

(73) Assignee: International Business Machines Corporation, Armonk, NY (US)

( * ) Notice: Subject to any disclaimer, the term of this patent is extended or adjusted under 35 U.S.C. 154(b) by 1161 days.

(21) Appl. No.: 11/853,927

(22) Filed: Sep. 12, 2007

(65) Prior Publication Data

US 2009/0067334 A1 Mar. 12, 2009

(51) Int. Cl.
G06F 9/46 (2006.01)
G06F 15/173 (2006.01)
G06F 15/76 (2006.01)
G06F 15/00 (2006.01)

(52) U.S. Cl. ............ 718/105; 709/226; 712/10; 712/11; 712/12; 712/225; 712/28

(58) Field of Classification Search .................... 718/105
See application file for complete search history.

(56) References Cited

U.S. PATENT DOCUMENTS

| | | | |
|---|---|---|---|
| 3,885,169 A | 5/1975 | Heightley | |
| 5,218,676 A | 6/1993 | Ben-Ayed et al. | |
| 5,347,450 A | 9/1994 | Nugent | |
| 5,453,978 A | 9/1995 | Sethu et al. | |
| 5,517,662 A | 5/1996 | Coleman et al. | |
| 5,539,659 A * | 7/1996 | McKee et al. ................. | 709/224 |
| 5,745,703 A | 4/1998 | Cejtin et al. | |
| 5,933,425 A | 8/1999 | Iwata | |
| 5,944,779 A | 8/1999 | Blum | |
| 6,081,506 A | 6/2000 | Buyukkoc et al. | |
| 6,486,983 B1 | 11/2002 | Beshai et al. | |
| 6,748,413 B1 | 6/2004 | Bournas | |
| 6,789,126 B1 | 9/2004 | Saulpaugh et al. | |
| 7,065,549 B2 | 6/2006 | Sun et al. | |
| 7,319,695 B1 | 1/2008 | Agarwal et al. | |
| 7,444,385 B2 | 10/2008 | Blumrich et al. | |
| 2004/0001508 A1 | 1/2004 | Zheng et al. | |
| 2005/0018682 A1 | 1/2005 | Ferguson et al. | |
| 2005/0068946 A1 | 3/2005 | Beshai | |
| 2005/0100035 A1 | 5/2005 | Chiou et al. | |
| 2005/0108425 A1 | 5/2005 | Rabinovitch | |

(Continued)

OTHER PUBLICATIONS

Georg Stellner, "CoCheck: Checkpointing and Process Migration for MPI", 1996, Proceedings of the 10th International Parallel Processing Symposium (IPPS '96).*

(Continued)

*Primary Examiner* — Lewis A Bullock, Jr.
*Assistant Examiner* — Kevin X Lu
(74) *Attorney, Agent, or Firm* — Patterson & Sheridan LLP (57) ABSTRACT

Embodiments off the invention provide a mechanism for process migration on a massively parallel computer system. In particular, embodiments of the invention may be used to update process state data for a migrated compute node, such as MPI (or other communication library) state data, across a full collection of compute nodes present in a given parallel system executing a parallel task. Migrating a process form one compute node to another may be useful to address a variety of sub-optimal operating conditions. For example, one or more processes may be migrated to cure network congestion resulting from a poorly mapped task or when a compute node is predicted to experience a hardware failure.

20 Claims, 6 Drawing Sheets

U.S. PATENT DOCUMENTS

2006/0002424 A1 1/2006 Gadde
2008/0016249 A1 1/2008 Ellis et al.
2010/0185718 A1 7/2010 Archer et al.

OTHER PUBLICATIONS

Sankaran et al., "The LAM/MPI Checkpoint/Restart Framework: System-Initiated Checkpointing," International Journal of High Performance Computing Applications, Winter 2005, vol. 19, No. 4, pp. 479-493.*

Subhlok et al., "Automatic Node Selection for High Performance Applications on Networks," PPoPP '99, vol. 34, issue 8, Aug. 1999.*

G. Almasi et al., "Design and Implementation of Message-Passing Services for the Blue Gene/L Supercomputer," IBM J. Res. & Dev. vol. 49, No. 2/3, Mar./May 2005.*

A. Gara et al., "Overview of the Blue Gene/L System Architecture," IBM J. Res. & Dev., vol. 49, No. 2/3, Mar./May 2005.*

Baydal et al., "Avoiding Network Congestion with Local Information", 2002, ISHPC 2002.*

Ribler, Randy L. et al., The Autopilot Performance-Directed Adaptive Control System, Future Generations Computer Systems, Sep. 2001, pp. 175-187, vol. 18, Issue 1, Elsevier Science Publishers, Amsterdam, The Netherlands.

Zhang, Yan et al., Automatic Performance Tuning for J2EE Application Server Systems, Lecture Notes in Computer Science, vol. 3806, 2005, pp. 520-527, Springer Verlag, New York, New York, United States.

Chung, I-Hsin et al., Automated Cluster-Based Web Service Performance Tuning, Proceedings of the 13th IEEE International Symposium on High Performance Distributed Computing, 2004, pp. 36-44, IEEE Computer Society, Washington, DC, United States.

Hondroudakis, Anna et al., An Empirically Derived Framework for Classifying Parallel Program Performance Tuning Problems, Proceedings of the Sigmetrics Symposium on Parallel and Distributed Tools, 1998, pp. 112-123, ACM, New York, New York, United States.

Mueller, et al, "PE Mapping and the Contention Problem on the T3E", printed on Sep. 12, 2007 from http://www.hlrs.de/people/mueller/papers/pe-mapping/pe-mapping.html.

* cited by examiner

MECHANISM FOR PROCESS MIGRATION ON A MASSIVELY PARALLEL COMPUTER

BACKGROUND OF THE INVENTION

1. Field of the Invention

The present invention generally relates to data processing and more particularly to a mechanism for process migration on a massively parallel computer system.

2. Description of the Related Art

Powerful computers may be designed as highly parallel systems where the processing activity of hundreds, if not thousands, of processors (CPUs) are coordinated to perform computing tasks. These systems are highly useful for a broad variety of applications including, financial modeling, hydrodynamics, quantum chemistry, astronomy, weather modeling and prediction, geological modeling, prime number factoring, image processing (e.g., CGI animations and rendering), to name but a few examples.

For example, one family of parallel computing systems has been (and continues to be) developed by International Business Machines (IBM) under the name Blue Gene®. The Blue Gene/L architecture provides a scalable, parallel computer that may be configured with a maximum of 65,536 ($2^{16}$) compute nodes. Each compute node includes a single application specific integrated circuit (ASIC) with 2 CPU's and memory. The Blue Gene/L architecture has been successful and on Oct. 27, 2005, IBM announced that a Blue Gene/L system had reached an operational speed of 280.6 teraflops (280.6 trillion floating-point operations per second), making it the fastest computer in the world at that time. Further, as of June 2005, Blue Gene/L installations at various sites worldwide were among five out of the ten top most powerful computers in the world.

The compute nodes in a parallel system typically communicate with one another over multiple communication networks. For example, the compute nodes of a Blue Gene/L system are interconnected using five specialized networks. The primary communication strategy for the Blue Gene/L system is message passing over a torus network (i.e., a set of point-to-point links between pairs of nodes). The torus network allows application programs developed for parallel processing systems to use high level interfaces such as Message Passing Interface (MPI) and Aggregate Remote Memory Copy Interface (ARMCI) to perform computing tasks and distribute data among a set of compute nodes. Of course, other message passing interfaces have been (and are being) developed. Other parallel architectures also use MPI and ARMCI for data communication between compute nodes connected via a variety of network topologies. Typically, MPI messages are encapsulated in a set of packets which are transmitted from a source node to a destination node over a communications network (e.g., the torus network of a Blue Gene system).

Another network connecting compute nodes of a Blue Gene system is a global combining network, in which the nodes are connected into a binary tree. Each compute node has a parent and at most two children. In a Blue Gene system, the combining tree and the torus networks are independent of one another, i.e., they do not share network resources such as links or packet injection FIFOs.

Accordingly, embodiments of the present invention provide mechanisms for process migration on a massively parallel computer system.

SUMMARY OF THE INVENTION

One embodiment of the invention includes a method of migrating a process running on a first compute node of a parallel computing system having a plurality of compute nodes. The method generally includes quiescing a data communications network connecting the plurality of compute nodes, and while the data communications network is quiesced, identifying a process identifier (ID) associated with the process running on the first compute node, identifying a network address associated with the first compute node, and flushing, from a mapping data structure maintained by the parallel system, a first entry mapping the identified process ID to the identified network address. The method also includes transmitting a message to the plurality of compute nodes to flush a local cache of mappings between process IDs and network addresses, migrating the process running on the first compute node to a second compute node, of the plurality of compute nodes of the parallel computing system, and updating the mapping data structure maintained by the parallel system to include a second entry mapping the identified process ID to a network address of the second compute node.

Another embodiment of the invention includes a computer-readable storage medium containing a program which, when executed, performs an operation of migrating a process running on a first compute node of a parallel computing system having a plurality of compute nodes. The operation may generally include quiescing a data communications network connecting the plurality of compute nodes, and while the data communications network is quiesced, identifying a process identifier (ID) associated with the process running on the first compute node, identifying a network address associated with the first compute node, and flushing, from a mapping data structure maintained by the parallel system, a first entry mapping the identified process ID to the identified network address. The operation also includes transmitting a message to the plurality of compute nodes to flush a local cache of mappings between process IDs and network addresses, migrating the process running on the first compute node to a second compute node, of the plurality of compute nodes of the parallel computing system, and updating the mapping data structure maintained by the parallel system to include a second entry mapping the identified process ID to a network address of the second compute node.

Still another embodiment of the invention includes a parallel computing system, having a plurality of compute nodes, each having at least a processor and a memory. The plurality of compute nodes may be configured to execute a parallel computing task, where a process executing on each compute node is identified by a respective process identifier (ID). The system also includes an input/output (I/O) node having a processor and a memory. The I/O node is configured to maintain a mapping data structure that maps the process ID for the process running on a given compute node to a network address of the given compute node. The system also includes a data communications network connecting the plurality of compute nodes and connecting the plurality of compute nodes to the I/O node. The system also includes a service node having at least a processor and a memory. The memory of the service node includes a program which, when executed by the processor of the service node, migrates the process running on a first compute node of the parallel computing system to a second compute node of the parallel computing system by performing an operation. The operation may generally include quiescing the data communications network connecting the plurality of compute nodes and, while the data communications network is quiesced, identifying a process identifier (ID) associated with the process running on the first compute node, identifying a network address associated with the first compute node, and flushing, from a mapping data structure maintained by the parallel system, a first entry mapping the identified process ID to the identified network address. The operation may further include transmitting a message to the plurality of compute nodes to flush a local cache of mappings between process IDs and network addresses, migrating the process running on the first compute node to a second compute node, of the plurality of compute nodes of the parallel computing system, and updating the mapping data structure maintained by the parallel system to include a second entry mapping the identified process ID to a network address of the second compute

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide a mechanism for process migration on a massively parallel computer system. In particular, embodiments of the invention may be used to update process state data for a migrated compute node, such as MPI (or other communication library) state data, across a full collection of compute nodes present in a given parallel system executing a parallel task. Migrating a process from one compute node to another may be useful to address a variety of sub-optimal operating conditions. For example, one or more processes may be migrated to cure network congestion resulting from a poorly mapped task or when a compute node is predicted to experience a hardware failure.

In a parallel system, jobs are mapped to compute nodes of the system and the compute nodes communicate with one another to perform parallel computing tasks, e.g., using MPI or other parallel library. However, there is only a finite number of links in any given communication network of a parallel system, so it is possible for network traffic to overlap and cause congestion problems. This can be a function of the mapping, i.e., how a job is mapped to the compute nodes, or the communication patterns of a given job.

Thus, in some cases it is desirable to migrate a process running on one compute node to another. For example, a process may be migrated to relive network traffic congestion created by a poor mapping of a job to the compute nodes of the parallel computing system, or a process may be migrated based on a prediction that a given compute node is likely to experience a hardware failure in the near future. On a massively parallel computer system, process migration requires moving the process state and process memory from one compute node to another. For example, U.S. patent application Ser. No. 11/531,175, titled "Performing Process Migration with Allreduce Operations" discloses one technique for quick migration of process memory. However, MPI (and other parallel libraries) assign and share information regarding the compute nodes running a given job. Thus, simply moving a process and memory state from one node to another may in some cases be inadequate, as other compute nodes in the system now reflect outdated MPI state data regarding the migrated compute node.

On a massively parallel system, such as a Blue Gene system, a group of compute nodes cooperates to perform a parallel computing task. Typically, the process running on a given compute node in the group may be identified using a process ID. For example, as is known, the MPI specification uses the term "MPI rank" to refer to a process ID assigned to a task running on a given compute node. Developers use the MPI rank of a given process to specify the source and destination of messages. On a Blue Gene system, the MPI rank associated with a processes on a given compute node may be mapped to a set of x-y-z coordinates for that node within the torus network. Thus, when that process is migrated to a new compute node, the x-y-z torus network coordinate associated with the MPI rank of the migrated process needs to be updated.

In the following, reference is made to embodiments of the invention. However, it should be understood that the invention is not limited to specifically described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM or DVD-ROM disks readable by a CD- or DVD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks.

Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
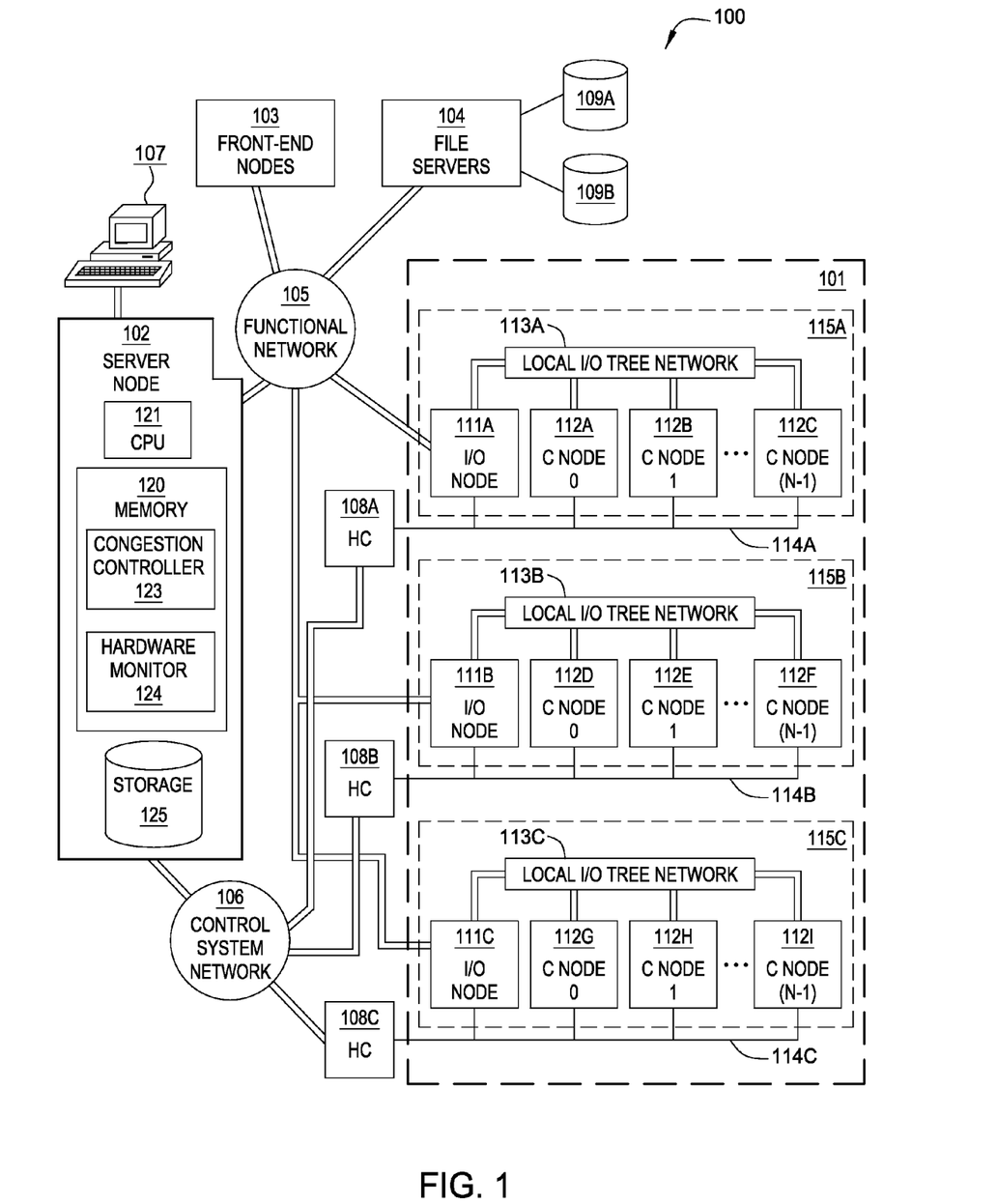
FIG. 1 is a high-level block diagram of components of a massively parallel computer system, according to one embodiment of the present invention.

FIG. 1 is a high-level block diagram of components of a massively parallel computer system 100, according to one embodiment of the present invention. Illustratively, computer system 100 shows the high-level architecture of an IBM Blue Gene® computer system, it being understood that other parallel computer systems could be used, and the description of a preferred embodiment herein is not intended to limit the present invention.

As shown, computer system 100 includes a compute core 101 having a plurality of compute nodes 112 arranged in a regular array or matrix. Compute nodes 112 perform the useful work performed by system 100. The operation of computer system 100, including compute core 101, may be controlled by service node 102. Various additional processors in front-end nodes 103 may perform auxiliary data processing functions, and file servers 104 provide an interface to data storage devices such as disk based storage 109A, 109B or other I/O (not shown). Functional network 105 provides the primary data communication path among compute core 101 and other system components. For example, data stored in storage devices attached to file servers 104 is loaded and stored to other system components through functional network 105.

Also as shown, compute core 101 includes I/O nodes 111A-C and compute nodes 112A-I. Compute nodes 112 provide the processing capacity of parallel system 100, and are configured to execute applications written for parallel processing. I/O nodes 111 handle I/O operations on behalf of compute nodes 112. For example, the I/O node 111 may retrieve data from file servers 104 requested by one of compute nodes 112. Each I/O node 111 may include a processor and interface hardware that handles I/O operations for a set of N compute nodes 112, the I/O node and its respective set of N compute nodes are referred to as a Pset. Compute core 101 contains M Psets 115A-C, each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by compute core 101 to execute user applications, as well as data output produced by the compute core 101, is communicated over functional network 105. The compute nodes within a Pset 115 communicate with the corresponding I/O node over a corresponding local I/O tree network 113A-C. The I/O nodes, in turn, are connected to functional network 105, over which they communicate with I/O devices attached to file servers 104, or with other system components. Thus, the local I/O tree networks 113 may be viewed logically as extensions of functional network 105, and like functional network 105, are used for data I/O, although they are physically separated from functional network 105.

Additionally, as shown, each of I/O nodes 111A-C includes an MPI rank mapping table 116A-C. In one embodiment, MPI rank mapping tables 116A-C store mappings between an <x, y, z> network coordinate of a given compute node 112 and an MPI rank value assigned to a process running on that compute node 112. Thus, when one of compute nodes 112 needs to transmit a message to a process with a given MPI rank, that compute node may request the appropriate <x, y, z> coordinates from I/O node 111. Further, each compute node 112 may maintain a local cache of mappings between MPI ranks and <x, y, z> network coordinates.

Service node 102 may be configured to direct the operation of the compute nodes 112 in compute core 101. In one embodiment, service node 102 is a computer system that includes a processor (or processors) 121, internal memory 120, and local storage 125. An attached console 107 (i.e., a keyboard, mouse, and display) may be used by a system administrator or similar person to initialize computing jobs on compute core 101. Service node 102 may also include an internal database which maintains state information for the compute nodes in core 101, and an application which may be configured to, among other things, control the allocation of hardware in compute core 101, direct the loading of data on compute nodes 111, migrate process running on one of compute nodes 112 to another one of compute nodes 112, and perform diagnostic and maintenance functions.

In one embodiment, service node 102 communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate. In one embodiment, control system network 106 may include a JTAG (Joint Test Action Group) network, configured to provide a hardware monitoring facility. As is known, JTAG is a standard for providing external test access to integrated circuits serially, via a four- or five-pin external interface. The JTAG standard has been adopted as an IEEE standard. Within a Blue Gene system, the JTAG network may be used to send performance counter data to service node 102 in real-time. That is, while an application is running on compute core 101, performance data may be gathered and transmitted to service node 102 without affecting the performance of that application.

Illustratively, memory 120 of service node 102 includes a congestion controller 123 and a hardware monitor 124. In one embodiment, congestion controller 123 and hardware monitor 124 may be configured to monitor the ongoing state of a job running on compute core 101 in order to determine if (and when) a given process should be migrated from one of compute nodes 112 to another compute node 112. Congestion controller 123 may be configured to identify network congestion by monitoring network performance counter data received over control system network 106. For example, in one embodiment, control system network 106 may be configured to record the number of network packets that pass through any of the six network ports (x+, x−, y+, y−, z+, z−) on a given compute node 112.

Similarly, hardware monitor 124 may be configured to monitor other performance data to predict when a given compute node 112 or communication link is likely to fail (e.g., CPU temperature, L3 parity errors, and torus and tree retransmits). In these cases, service node 102 may be configured to migrate a process running on one compute node 112 to another, improving both system performance and reliability. Of course, network congestion and hardware failure provide only two examples of when it may be appropriate to migrate a process from one compute node 112 to another, and one of ordinary skill in the art will readily identify other circumstances where process migration may be appropriate.

In addition to service node 102, front-end nodes 103 provide computer systems used to perform auxiliary functions which, for efficiency or otherwise, are best performed outside compute core 101. Functions which involve substantial I/O operations are generally performed in the front-end nodes 103. For example, interactive data input, application code editing, or other user interface functions are generally handled by front-end nodes 103, as is application code compilation. Front-end nodes 103 are also connected to functional network 105 and may communicate with file servers 104.

Figure 2:
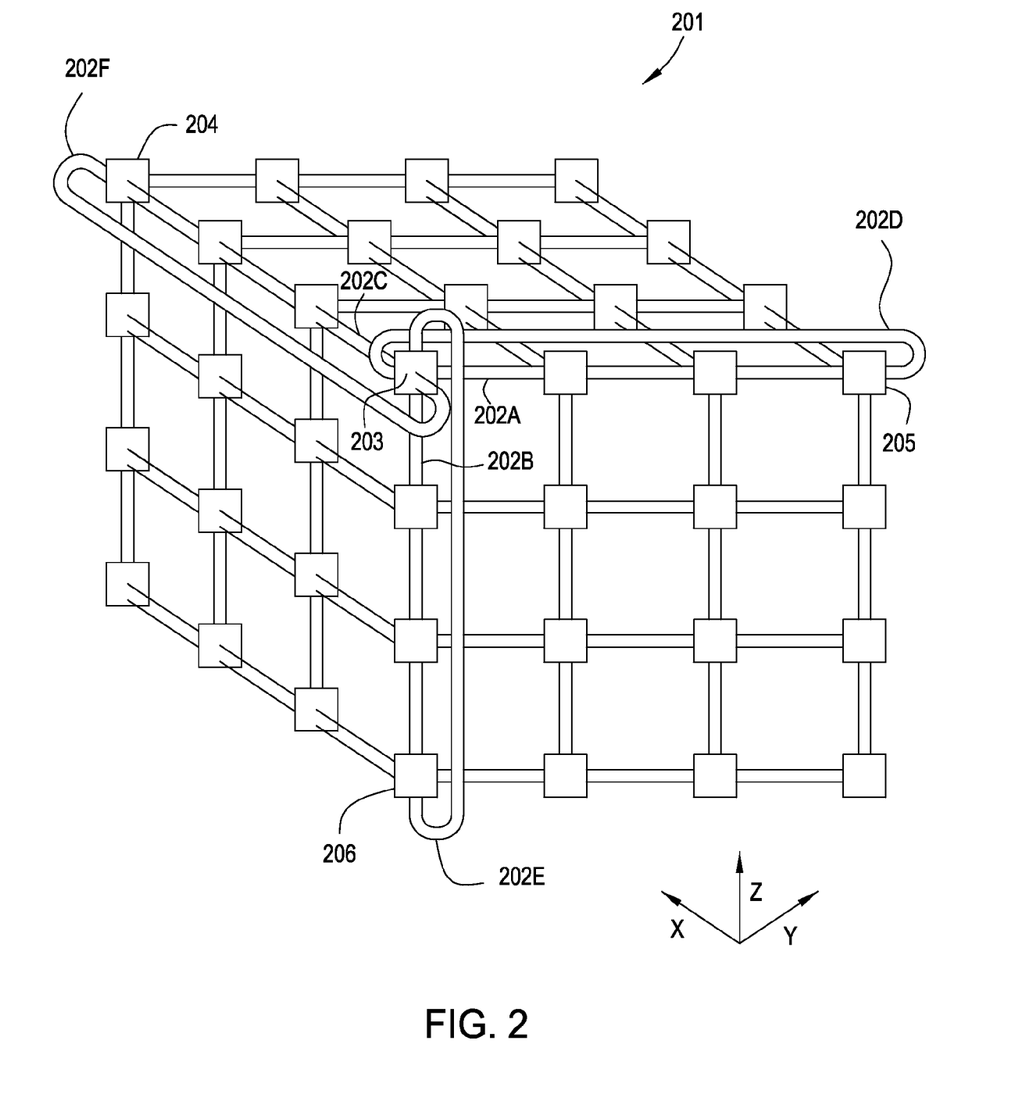
FIG. 2 is a conceptual illustration of a three dimensional torus network of the system of FIG. 1, according to one embodiment of the invention.

As stated, in a massively parallel computer system 100, compute nodes 112 may be logically arranged in a three-dimensional torus, where each compute node 112 may be identified using an x, y and z coordinate. FIG. 2 is a conceptual illustration of a three-dimensional torus network of system 100, according to one embodiment of the invention. More specifically, FIG. 2 illustrates a 4×4×4 torus 201 of compute nodes, in which the interior nodes are omitted for clarity. Although FIG. 2 shows a 4×4×4 torus having 64 nodes, it will be understood that the actual number of compute nodes in a parallel computing system is typically much larger. For example, a complete Blue Gene/L system includes 65,536 compute nodes. Each compute node 112 in torus 201 includes a set of six node-to-node communication links 202A-F which allows each compute nodes in torus 201 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y, or z dimensions form a torus in that dimension because the point-to-point communication links logically wrap around. For example, this is represented in FIG. 2 by links 202D, 202E, and 202F which wrap around from compute node 203 to other end of compute core 201 in each of the x, y and z dimensions. Thus, although node 203 appears to be at a "corner" of the torus, node-to-node links 202A-F link node 203 to nodes 204, 205, and 206, in the x, y, and Z dimensions of torus 201.

Figure 3:
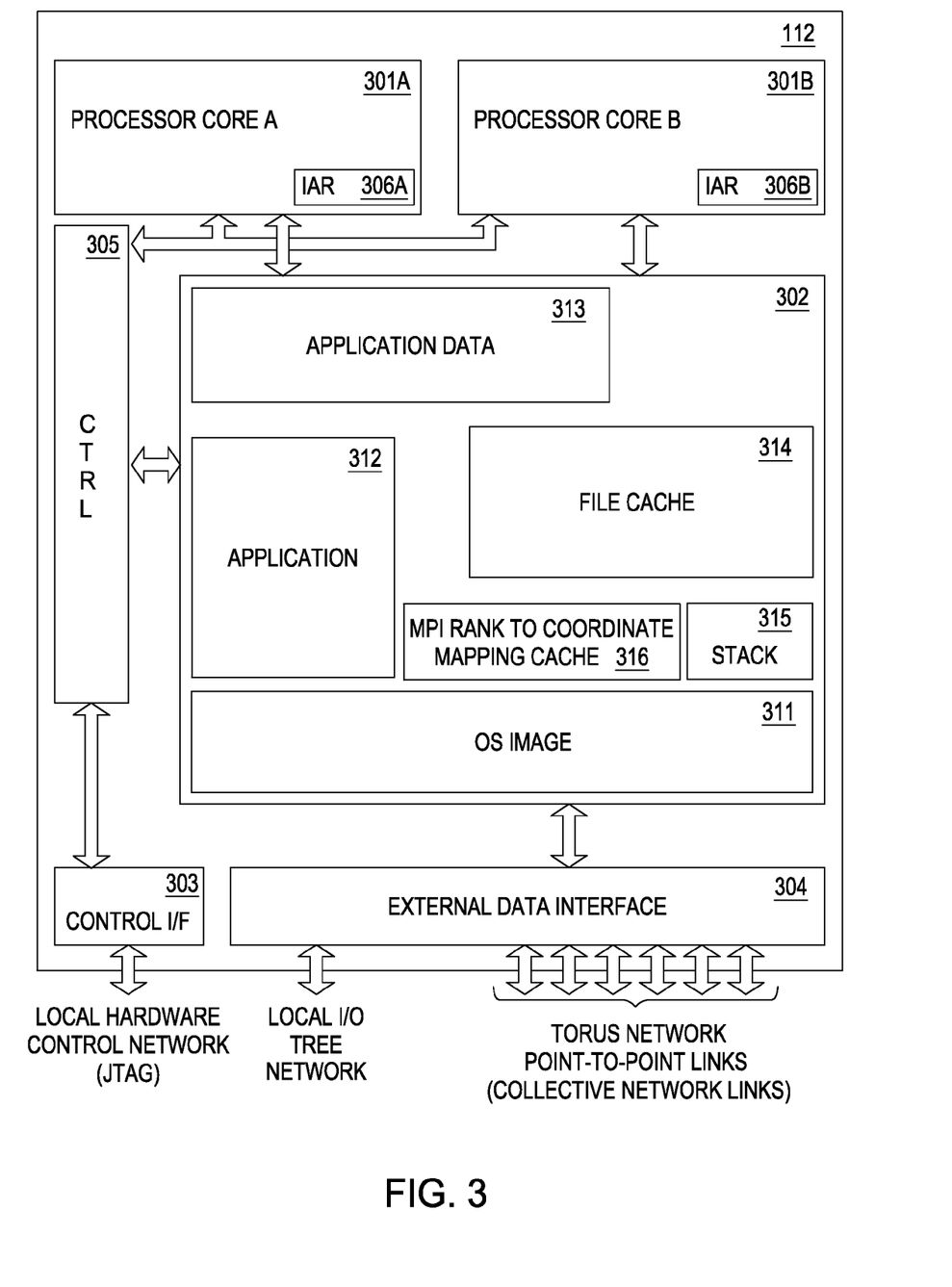
FIG. 3 is a high-level diagram of a compute node of the system of FIG. 1, according to one embodiment of the invention.

FIG. 3 is a high-level diagram of a compute node 112 of the system 100 of FIG. 1, according to one embodiment of the invention. As shown, compute node 112 includes processor cores 301A and 301B, each having an instruction address register 306A and 306B. Compute node 112 also includes memory 302 used by both processor cores 301; an external control interface 303 which is coupled to local hardware control network 114 (e.g., control system network 106); an external data communications interface 304 which is coupled to the corresponding local I/O tree network 113 (e.g., functional network 105) and the corresponding six node-to-node links 202 of the torus network 201; and includes monitoring and control logic 305 which receives and responds to control commands received through external control interface 303. Monitoring and control logic 305 may access processor cores 301 and locations in memory 302 on behalf of service node 102 to read (or in some cases alter) the operational state of node 112. In one embodiment, each compute node 112 may be physically implemented as a single integrated circuit.

As described, functional network 105 may service many I/O nodes 113, and each I/O node 113 is shared by a group of compute nodes 112 (i.e., a Pset). Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3, memory 302 stores an operating system image 311, an application code image 312, and user application data structures 313, as required. Illustratively, memory 302 also includes a cache 316 used to store mappings between an MPI rank of a process running on a given compute node and an <x, y, z> coordinate location of the given compute node. Additionally, memory 302 may also include a file cache 314, i.e., a cache of data read from or to be written to an I/O file. Operating system image 311 provides a copy of a simplified-function operating system running on compute node 112. Operating system image 311 may includes a minimal set of functions required to support operation of the compute node 112. In a Blue Gene system, for example, operating system image 311 contains a version of the Linux® operating system customized to run on compute node 112. Of course, other operating systems may be used, and further it is not necessary that all nodes employ the same operating system. (Also note, Linux® is a registered trademark of Linus Torvalds in the United States and other countries.)

Application code image 312 represents a copy of the parallel program being executed by compute nodes 112. Application code image 302 may include a copy of a computer program being executed by multiple compute nodes 112, but where the program is very large and complex, it may be subdivided into portions where different programs run on different compute nodes 112 to cooperate and, collectively, accomplish a parallel computing task. Memory 302 may also include a call-return stack 315 for storing the states of procedures which must be returned to, which is shown separate from application code image 302, although it may be considered part of application code state data.

As part of ongoing operations, application 312 may be configured to transmit messages from compute node 112 to other compute nodes in parallel system 100. For example, the MPI call of MPI_Send( ); may be used by application 312 to transmit a message from one compute node to another. On the other side of the communication, the receiving compute node may use the MPI call MPI_Receive( ); to receive the message. As described above, in a Blue Gene system, the external data interface 304 to transmit the MPI message by encapsulating it within a set of packets and transmitting the packets of over the torus network of point-to-point links. The packets may be transmitted to a compute node having the <x, y, z> coordinates associated with the MPI rank specified as the destination of the message. The receiving compute node (with the <x, y, z> coordinates of the message destination) may buffer the packets until the application process running on the receiving node invokes the MPI_Receive( ); call. Other parallel systems and other parallel computing libraries use similar mechanisms for transmitting messages between different compute nodes.

Figure 4A:
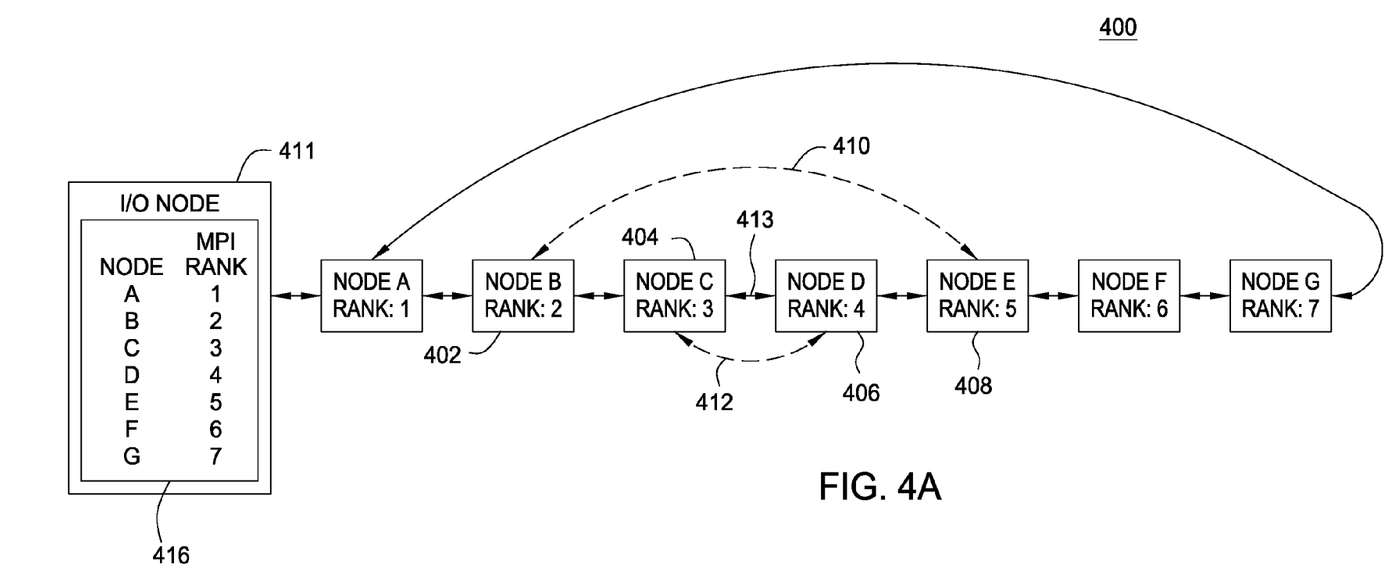
FIGS. 4A and 4B provide a conceptual illustration of network congestion among compute nodes of a parallel computer system, according to one embodiment of the invention.
Figure 4B:
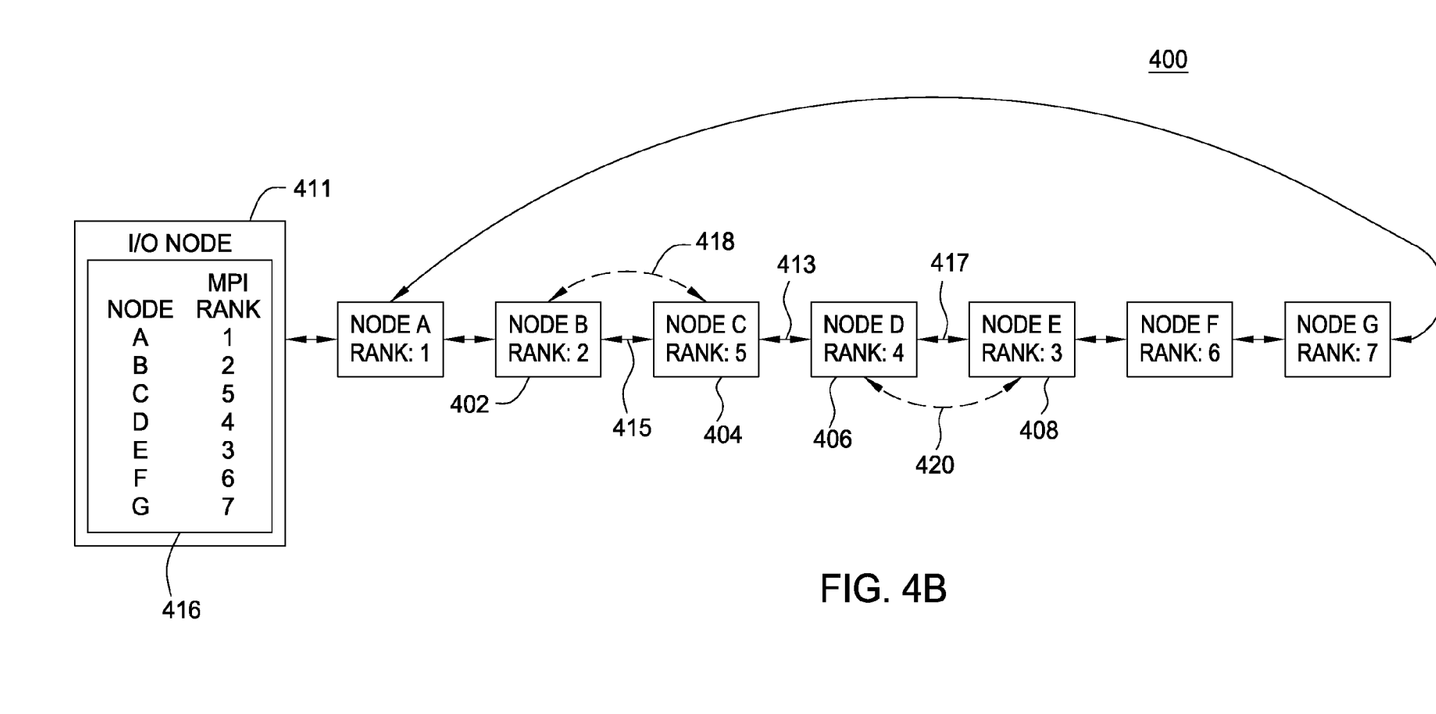

FIGS. 4A and 4B provide a conceptual illustration of network congestion among compute nodes of a parallel computer system 400, according to one embodiment of the invention.

As shown in FIG. 4A, a parallel computing system 400 includes an I/O node 411 and seven compute nodes connected in a one-dimensional torus. Additionally, a compute node 402 (having a network address of "B" and an MPI rank of 2) is sending messages to a compute node 408 (having a network address of "E" and an MPI rank of 5), as indicated by an arrow 410. To send the message, in one embodiment, compute node 402 first requests the network address of the compute node running the process with the MPI rank of 5 (in this case compute node 408) from I/O node 411. In response, I/O node 411 identifies the network address associated with the MPI rank of 5 from a mappings table 416 (in this case network address "E") and sends this network address to compute node 402. In one embodiment, node 402 may cache this information for use in transmitting subsequent messages. Compute node 402 then transmits the messages to compute node 408, using the network address of "E" as the destination address of the message. Given the network topology of system 400, and the relative positions of compute nodes 402 and 408, such a message is passed point-to-point from compute node 402 to node 404, from compute node 404 to node 406, and finally from compute node 406 to node 408.

At the same time, compute node 404 (having a network address of "C" and an MPI rank of 3) is sending messages to a compute node 406 (having a network coordinate of "D" and an MPI rank of 4), as indicated by an arrow 412. Accordingly, based on the mapping of the processes running on parallel system 400, messages passed from compute node 402 to node 408 as well as messages passed from compute node 404 to node 406 pass through link 413. Thus, in this example, link 413 may become congested, degrading system performance.

FIG. 4B shows parallel computing system 400, after the process with MPI rank of 5 has been migrated to compute node 404, and after the process with MPI rank of 3 has been migrated to compute node 408, according to one embodiment of the invention. As shown, mappings table 416 has been updated to reflect the migration of these two processes. Further, the process with an MPI rank of 2 (running on compute node 402 with network address "B") may communicate over a communication link 415 with the process with an MPI rank of 5 (running on compute node 404 with network address "C"), as shown by an arrow 418. Similarly, the process with an MPI rank of 4 (running on compute node 406 with network address "D") may communicate over a communication link 417 with the process with an MPI rank of 3 (running on compute node 408 with network address "E"), as shown by an arrow 420. After the process migration, compute nodes 402 may exchange messages with compute node 404 and compute nodes 406 may exchange messages with compute node 408 without interfering with one another. Further the messages passed between compute nodes 402 and 404 (representing communication between processes with MPI ranks of 2 and 5) occur over a single communication link 415, as apposed to having to traverse from compute node 402 to node 408. Thus, in this example scenario of process migration, not only is network congestion reduced, but network latency is reduced as well.

Figure 5:
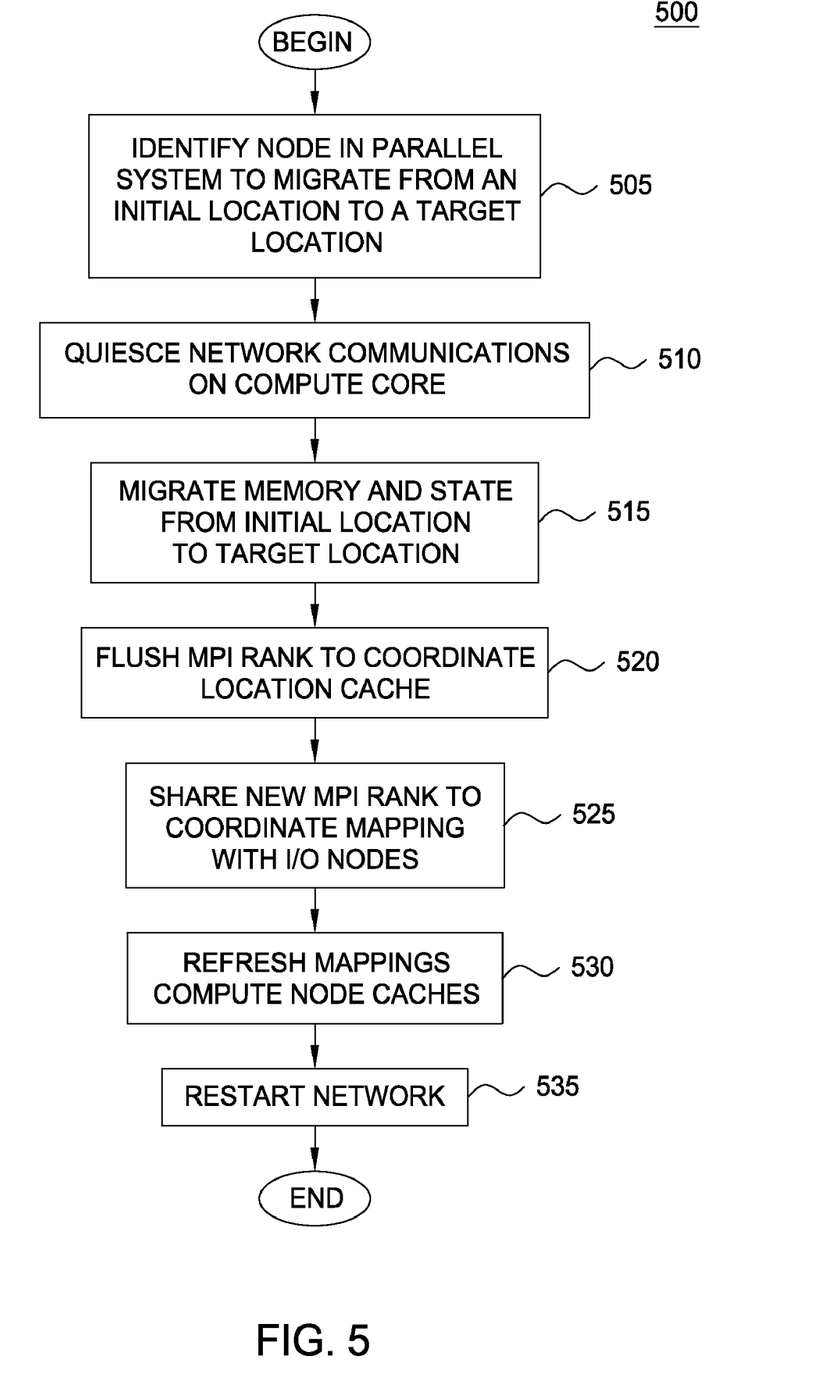
FIG. 5 is a flow diagram illustrating a method for process migration on a massively parallel computer system, according to one embodiment of the invention.

FIG. 5 is a flow diagram illustrating a method for process migration on a massively parallel computer system, according to one embodiment of the invention. As shown, the method begins at step 505 where a process running on a compute node in a parallel system is selected to be migrated from an initial location to a target location. As described above, for example, a process may be migrated to alleviate network congestion or in response to a prediction that the selected compute node is likely to experience a hardware or network communication failures. Of course, a process may be selected for migration in a variety of other scenarios as well.

At step 510, a communication network of the parallel system is quiesced to allow any then currently in progress data communications to complete. For example, on a Blue Gene system, all data communications on the torus network may be quiesced, allowing any point-to-point messages to reach their destination, but without any further messages being introduced onto the torus (e.g., any new MPI messages). At step 515, the process running on the compute node selected at step 505 may be migrated to the destination compute node. This may include migrating the contents of memory, registers and other state data to the destination node.

At step 520, caches of mappings between MPI ranks and network addresses are flushed. As described above, applications may maintain a cache of MPI rank and network address information. For example, in one embodiment, at step 520, the compute nodes included in an MPI communicator (i.e., the set of compute nodes running a common task on the parallel system) may invalidate any cached mappings of the network address and MPI rank of the process being migrated.

At step 525, the new MPI rank to coordinate mappings is shared with the I/O nodes of the parallel system. For example, the table 416 in FIG. 4B is shown after being updated with the new MPI rank to network address mappings after processes with MPI ranks of 3 and 5 are migrated to compute nodes 404 and 420, respectively. At step 530, caches stored on the compute nodes may be updated with the new mappings. At step 535, the communication network of the parallel system quiesced at step 510 may be restarted.

Once method 500 is complete, the memory and process state of the compute node selected at step 505 is migrated to the destination node. Further, process state data for the migrated compute node, such as MPI rank (or other communication library) state data has been updated across a full collection of compute nodes present in a given parallel system executing a parallel task. Advantageously, migrating a process form one compute node to another may be useful to address a variety of sub-optimal operating conditions. For example, one or more processes may be migrated to cure network congestion resulting from a poorly mapped task or when a compute node is predicted to experience a hardware failure.

While the foregoing is directed to embodiments of the present invention, other and further embodiments of the invention may be devised without departing from the basic scope thereof, and the scope thereof is determined by the claims that follow.

What is claimed is:

1. A method of migrating a process running on first compute node of a parallel computing system having a plurality of compute nodes, comprising:
   quiescing a data communications network connecting the plurality of compute nodes;
   while the data communications network is quiesced:
      identifying a process identifier (ID) associated with the process running on the first compute node;

identifying a network address associated with the first compute node;

flushing, from a mapping data structure maintained by the parallel system, a first entry mapping the identified process ID to the identified network address;

transmitting a message to the plurality of compute nodes to flush a local cache of mappings between process IDs and network addresses;

migrating the process running on the first compute node to a second compute node, of the plurality of compute nodes of the parallel computing system, wherein the migrating is performed upon: (i) detecting a network congestion by recording a number of network packets that pass through any of six network ports of the first compute node, and (ii) predicting a hardware failure for the first compute node; and updating the mapping data structure maintained by the parallel system to include a second entry mapping the identified process ID to a network address of the second compute node, wherein the data communication network is a three-dimensional torus and the network address of the first and second compute node is a respective <x, y, z> coordinate position of the first and second compute node within the three-dimensional torus.

2. The method of claim 1, further comprising, after updating the mapping data structure maintained by the parallel system to include the second entry, restarting the data communication network.

3. The method of claim 1, wherein the process ID is a Message Passing Interface (MPI) rank.

4. The method the claim 1, wherein the first compute node is migrated to alleviate network congestion on the data communications network connecting the plurality of compute nodes.

5. The method of claim 1, further comprising, selecting the second compute node from the plurality of compute nodes in order to alleviate network congestion on the data communications network connecting the plurality of compute nodes.

6. The method of claim 1, wherein the second compute node is selected to optimize the mapping data structure maintained by the parallel system.

7. A non-transitory computer-readable storage medium containing a program which, when executed, performs an operation of migrating a process running on a first compute node of a parallel computing system having a plurality of compute nodes, the operation comprising:

quiescing a data communications network connecting the plurality of compute nodes;

while the data communications network is quiesced:

identifying a process identifier (ID) associated with the process running on the first compute node;

identifying a network address associated with the first compute node;

flushing, from a mapping data structure maintained by the parallel system, a first entry mapping the identified process ID to the identified network address;

transmitting a message to the plurality of compute nodes to flush a local cache of mappings between process IDs and network addresses;

migrating the process running on the first compute node to a second compute node, of the plurality of compute nodes of the parallel computing system, wherein the migrating is performed upon: (i) detecting a network congestion by recording a number of network packets that pass through any of six network ports of the first compute node, and (ii) predicting a hardware failure for the first compute node; and updating the mapping data structure maintained by the parallel system to include a second entry mapping the identified process ID to a network address of the second compute node, wherein the data communication network is a three-dimensional torus and the network address of the first and second compute node is a respective <x, y, z> coordinate position of the first and second compute node within the three-dimensional torus.

8. The computer-readable storage medium of claim 7, wherein the operations further comprise, after updating the mapping data structure maintained by the parallel system to include the second entry, restarting the data communication network.

9. The computer-readable storage medium of claim 7, wherein the process ID is a Message Passing Interface (MPI) rank.

10. The computer-readable storage medium the claim 7, wherein the first compute node is migrated to alleviate network congestion on the data communications network connecting the plurality of compute nodes.

11. The computer-readable storage medium of claim 7, further comprising, selecting the second compute node from the plurality of compute nodes in order to alleviate network congestion on the data communications network connecting the plurality of compute nodes.

12. The computer-readable storage medium of claim 7, wherein the second compute node is selected to optimize the mapping data structure maintained by the parallel system.

13. A parallel computing system, comprising: a plurality of compute nodes, each having at least a processor and a memory, wherein the plurality of compute nodes is configured to execute a parallel computing task, and wherein a process executing on each compute node is identified by a respective process identifier (ID);

an input/output (I/O) node having a processor and a memory, wherein the I/O node is configured to maintain a mapping data structure that maps the process ID for the process running on a given compute node to a network address of the given compute node;

a data communications network connecting the plurality of compute nodes, and connecting the plurality of compute nodes to the I/O node; and a service node having at least a processor and a memory, wherein the memory of the service node includes a program which, when executed by the processor of the service node, migrates the process running on a first compute node of the parallel computing system to a second compute node of the parallel computing system by performing an operation, the operation comprising:

quiescing a data communications network connecting the plurality of compute nodes;

while the data communications network is quiesced:

identifying a process identifier (ID) associated with the process running on the first compute node;

identifying a network address associated with the first compute node;

flushing, from a mapping data structure maintained by the parallel system, a first entry mapping the identified process ID to the identified network address;

transmitting a message to the plurality of compute nodes to flush a local cache of mappings between process IDs and network addresses;

migrating the process running on the first compute node to a second compute node, of the plurality of compute nodes of the parallel computing system, wherein the migrating is performed upon: (i) detecting a network congestion by recording a number of network packets that pass through any of six network ports of the first compute node, and (ii) predicting a hardware failure for the first compute node; and updating the mapping data structure maintained by the parallel system to include a second entry mapping the identified process ID to a network address of the second compute node, wherein the data communication network is a three-dimensional torus and the network address of the first and second compute node is a respective <x, y, z> coordinate position of the first and second compute node within the three-dimensional torus.

14. The parallel computing system of claim 13, wherein the program is further configured to, after updating the mapping data structure maintained by the parallel system to include the second entry, restart the data communication network.

15. The parallel computing system of claim 13, wherein the process ID is a Message Passing Interface (MPI) rank.

16. The parallel computing system the claim 13, wherein the first compute node is migrated to alleviate network congestion on the data communications network connecting the plurality of compute nodes.

17. The parallel computing system of claim 13, wherein the program is further configured to select the second compute node from the plurality of compute nodes in order to alleviate network congestion on the data communications network connecting the plurality of compute nodes.

18. The method of claim 1, wherein the hardware failure of the first compute node is predicted based on at least one factor comprising: (i) a CPU temperature, (ii) an L3 parity error, and (iii) a torus and tree retransmit.

19. The computer-readable storage medium of claim 7, the hardware failure of the first compute node is predicted based on at least one factor comprising: (i) a CPU temperature, (ii) an L3 parity error, and (iii) a torus and tree retransmit.

20. The parallel computing system of claim 13, wherein the hardware failure of the first compute node is predicted based on at least one factor comprising: (i) a CPU temperature, (ii) an L3 parity error, and (iii) a torus and tree retransmit.

* * * * *